(12) United States Patent
Chung

(10) Patent No.: US 8,393,162 B2
(45) Date of Patent: Mar. 12, 2013

(54) TEMPERATURE CONTROL SYSTEM FOR SEAT OF VEHICLES

(76) Inventor: Sang-ho Chung, Sungnam (KR)

(*) Notice: Subject to any disclaimer, the term of this patent is extended or adjusted under 35 U.S.C. 154(b) by 505 days.

(21) Appl. No.: 12/438,728

(22) PCT Filed: Aug. 23, 2007

(86) PCT No.: PCT/KR2007/004039
§ 371 (c)(1),
(2), (4) Date: Aug. 24, 2010

(87) PCT Pub. No.: WO2008/023942
PCT Pub. Date: Feb. 28, 2008

(65) Prior Publication Data
US 2010/0300644 A1  Dec. 2, 2010

(30) Foreign Application Priority Data
Aug. 24, 2006  (KR) .................. 10-2006-0080607

(51) Int. Cl.
*F25B 21/02*  (2006.01)

(52) U.S. Cl. .................................. 62/3.61; 62/244

(58) Field of Classification Search ............. 62/3.2, 62/3.3, 3.4, 3.5, 3.61, 3.6, 259.3, 261, 244; 165/41, 42; 297/180.1, 180.14; 454/120, 454/907
See application file for complete search history.

(56) References Cited

U.S. PATENT DOCUMENTS

| | | | |
|---|---|---|---|
| 5,626,021 A * | 5/1997 | Karunasiri et al. | 62/3.5 |
| 5,921,314 A | 7/1999 | Schuller et al. | |
| 5,924,766 A | 7/1999 | Esaki et al. | |
| 6,079,485 A * | 6/2000 | Esaki et al. | 165/43 |
| 6,105,667 A * | 8/2000 | Yoshinori et al. | 165/202 |
| 6,505,886 B2 * | 1/2003 | Gielda et al. | 297/180.13 |
| 6,559,422 B2 * | 5/2003 | Burt | 219/217 |
| RE38,128 E * | 6/2003 | Gallup et al. | 62/3.5 |
| 6,928,829 B2 * | 8/2005 | Kamiya et al. | 62/244 |
| 7,108,319 B2 * | 9/2006 | Hartwich et al. | 297/180.1 |
| 7,201,441 B2 * | 4/2007 | Stoewe et al. | 297/180.14 |
| 7,229,129 B2 * | 6/2007 | White et al. | 297/180.12 |
| 7,287,812 B2 * | 10/2007 | Ishima et al. | 297/180.14 |
| 7,477,969 B2 * | 1/2009 | Panic | 701/36 |
| 2002/0057005 A1 | 5/2002 | Bargheer et al. | |

FOREIGN PATENT DOCUMENTS

KR  10-2002-0062289 A  7/2002
KR  10-2004-0001385 A  7/2004

* cited by examiner

*Primary Examiner* — Mohammad Ali
(74) *Attorney, Agent, or Firm* — Christopher Paul Mitchell

(57) ABSTRACT

A temperature control system includes an air duct, an air-blowing device, a seat back temperature control unit, and a seat cushion temperature control unit. The air-blowing device urges air to flow through the air duct. The seat back temperature control unit and the seat cushion temperature control unit performs heat exchanges between air flowing in the air duct and air supplied to a seat back and air supplied to a seat cushion, respectively. The air duct forms a single air passage passing by the seat back temperature control unit and the seat cushion temperature control unit so that the air flowing in the air duct undergoes heat exchange with one of the seat back temperature control unit and the seat cushion temperature control unit and then undergoes heat exchange with the other.

11 Claims, 2 Drawing Sheets

TEMPERATURE CONTROL SYSTEM FOR SEAT OF VEHICLES

RELATED APPLICATIONS

This application is a 371 application of International Application No. PCT/KR2007/004039, filed Aug. 23, 2007, which in turn claims priority from Korean Patent Application No. 10-2006-0080607, filed Aug. 24, 2006, both of which are incorporated herein by reference.

TECHNICAL FIELD

The present invention relates to a temperature control system for controlling temperature of a seat of a vehicle, and more particularly, to a temperature control system for controlling temperature of a seat of a vehicle by allowing temperature-controlled heat (i.e., cooling or heating') medium to flow in a seat of a vehicle.

BACKGROUND ART

A temperature control system for heating or cooling a vehicle seat by flowing temperature-controlled operating medium in the vehicle seat has been introduced. The conventional temperature control system of a vehicle seat cools or heats the operating medium using a thermoelectric module (heat pump) and urges the heated or cooled operating medium to flow in the vehicle seat so as to control temperature of the vehicle seat.

In the conventional temperature control system, the heat absorption part and the heat radiation part of the thermoelectric module are disposed within an air duct, so it is difficult and limited to optimize the heating and cooling efficiency and to integrate the system.

Further, since in the conventional temperature control system of a vehicle seat sucked air (operating medium) is sent to heat exchangers after being diverged into the heat absorption part and the heat radiation part and heat transfer areas of the heat exchangers of the heat absorption part and the heat radiation part are equal to one another, the cooling and heating performances are deteriorated. In order to overcome the problem of deterioration of the cooling and heating performances, capacities of the blower and the thermoelectric module should be increased, and this increases electric power consumption and thereby electric efficiency is deteriorated.

Further, since in the conventional temperature control system of a vehicle seat air is indirectly distributed by a blower which is installed at a center of an air duct passing by a seat cushion and a seat back, length of the air passage for supplying air to the seat cushion and the seat back becomes longer so that cooling and heating efficiencies are deteriorated.

Still further, since in the conventional temperature control system of a vehicle seat a heat absorption part and a heat radiation part are separated within an air duct, condensed water which is generated around a heat exchanger after cooling operation is stopped may be accumulated within the air duct, and the accumulated condensed water may cause stench.

DISCLOSURE OF INVENTION

Technical Problem

The present invention has been made in an effort to provide a temperature control system having advantages of efficiently cooling and heating a vehicle seat.

Technical Solution

An exemplary temperature control system which supplies temperature-controlled air to a vehicle seat so as to control temperature of the vehicle seat according to an embodiment of the present invention includes an air duct, an air-blowing device, a seat back temperature control unit, and a seat cushion temperature control unit. The air-blowing device urges air to flow through the air duct. The seat back temperature control unit performs heat exchange between air flowing in the air duct and air supplied to a seat back so as to control temperature of the air supplied to the seat back. The seat cushion temperature control unit performs heat exchange between air flowing in the air duct and air supplied to a seat cushion so as to control temperature of the air supplied to the seat cushion. The air duct forms a single air passage passing by the seat back temperature control unit and the seat cushion temperature control unit so that the air flowing in the air duct undergoes heat exchange with one of the seat back temperature control unit and the seat cushion temperature control unit and then undergoes heat exchange with the other.

The seat back temperature control unit may include: a first heat exchanger which is disposed within the air duct; a second heat exchanger which is disposed in an air moving passage through which air supplied to the seat back flows; a first thermoelectric element which is disposed between the first heat exchanger and the second heat exchanger so as to perform heat exchange between the first heat exchange and the second heat exchanger; and a first fan urging air to flow so that air having passed by the second heat exchanger is supplied to the seat back. The seat cushion temperature control unit may include: a third heat exchanger which is disposed within the air duct; a fourth heat exchanger which is disposed in an air moving passage through which air supplied to the seat cushion flows; a second thermoelectric element which is disposed between the third heat exchanger and the fourth heat exchanger so as to perform heat exchange between the third heat exchange and the fourth heat exchanger; and a second fan urging air to flow so that air having passed by the fourth heat exchanger is supplied to the seat cushion.

Heat transfer area of the first heat exchanger may be greater than heat transfer area of the second heat exchanger.

The heat transfer area of the first heat exchanger may be 2.5 to 3 times greater than the heat transfer area of the second heat exchanger.

Heat transfer area of the third heat exchanger may be greater than heat transfer area of the fourth heat exchanger.

The heat transfer area of the third heat exchanger may be 2.5 to 3 times greater than the heat transfer area of the fourth heat exchanger.

The seat back temperature control unit may further include a case which houses the second heat exchanger and the first thermoelectric element, and the case may define a condensed water passage which is configured to send condensed water formed on a surface of the second heat exchanger to the first heat exchanger.

The seat cushion temperature control unit may further include a case which houses the fourth heat exchanger and the third thermoelectric element, and the case may define a condensed water passage which is configured to send condensed water formed on a surface of the fourth heat exchanger to the third heat exchanger.

The air-blowing device may urge air to flow so that air flowing in the air duct firstly passes by the seat back temperature control unit and then passes by the seat cushion temperature control unit, and the air duct may be configured to suck air behind the seat back and to discharge air below the seat cushion.

The air-blowing device may urge air to flow so that air flowing in the air duct firstly passes by the seat cushion temperature control unit and then passes by the seat back temperature control unit, and the air duct may be configured to suck air below the seat cushion and to discharge air behind the seat back.

In another embodiment of the present invention, the temperature control system may further include a control unit for controlling the seat back temperature control and the seat cushion temperature control unit.

Advantageous Effects

According to the present invention, since the air duct forms a single air passage so that air flowing therein sequentially undergoes heat exchanges with the seat back temperature control unit and the seat cushion temperature control unit, the overall structure of the temperature control system is simplified and air having undergone heat exchange is discharged through a single passage so that a mechanism for preventing air after the heat exchange from being discharged directly toward a passenger does not need.

Further, since the seat back temperature control unit and the seat cushion temperature control unit are respectively provided with separate fans for supplying temperature-controlled air, the temperature control function for the seat back and the seat cushion can be optimized.

Further, since the heat transfer areas of the heat exchangers which are disposed in the air duct are respectively greater than the heat transfer areas of the heat exchangers which are disposed in the air passages for supplying air to the seat back and the seat cushion, the heat exchange efficiency can be enhanced when cooled air is supplied to the seat back and the seat cushion. In particular, since the heat transfer areas of the heat exchangers which are disposed in the air duct are 2.5 to 3 times greater than the heat transfer areas of the heat exchangers which are disposed in the air passages for supplying air to the seat back and the seat cushion, the heat exchange efficiency can be optimized when cooled air is supplied to the seat back and the seat cushion.

Still further, since the condensed water passages for sending condensed water generated on the surface of the heat exchanger which is disposed in the air passage for supplying air to the seat back and the seat cushion to the heat exchanger which is disposed in the air duct are provided, condensed water which is generated after the cooling operation can be effectively evaporated by the heated heat exchanger which is disposed in the air duct. Accordingly, it can be prevented that the accumulated condensed water causes stench or bacteria grows in the accumulated condensed water.

Still further, since the air duct is formed to suck air behind the seat back and to discharge air below the seat cushion, air having undergone heat exchange can be prevented from being discharged directly toward a passenger even without an additional structure.

EXPLANATIONS TO REFERENCE NUMERALS FOR THE PRIMARY PARTS OF THE DRAWINGS

Figure 1:
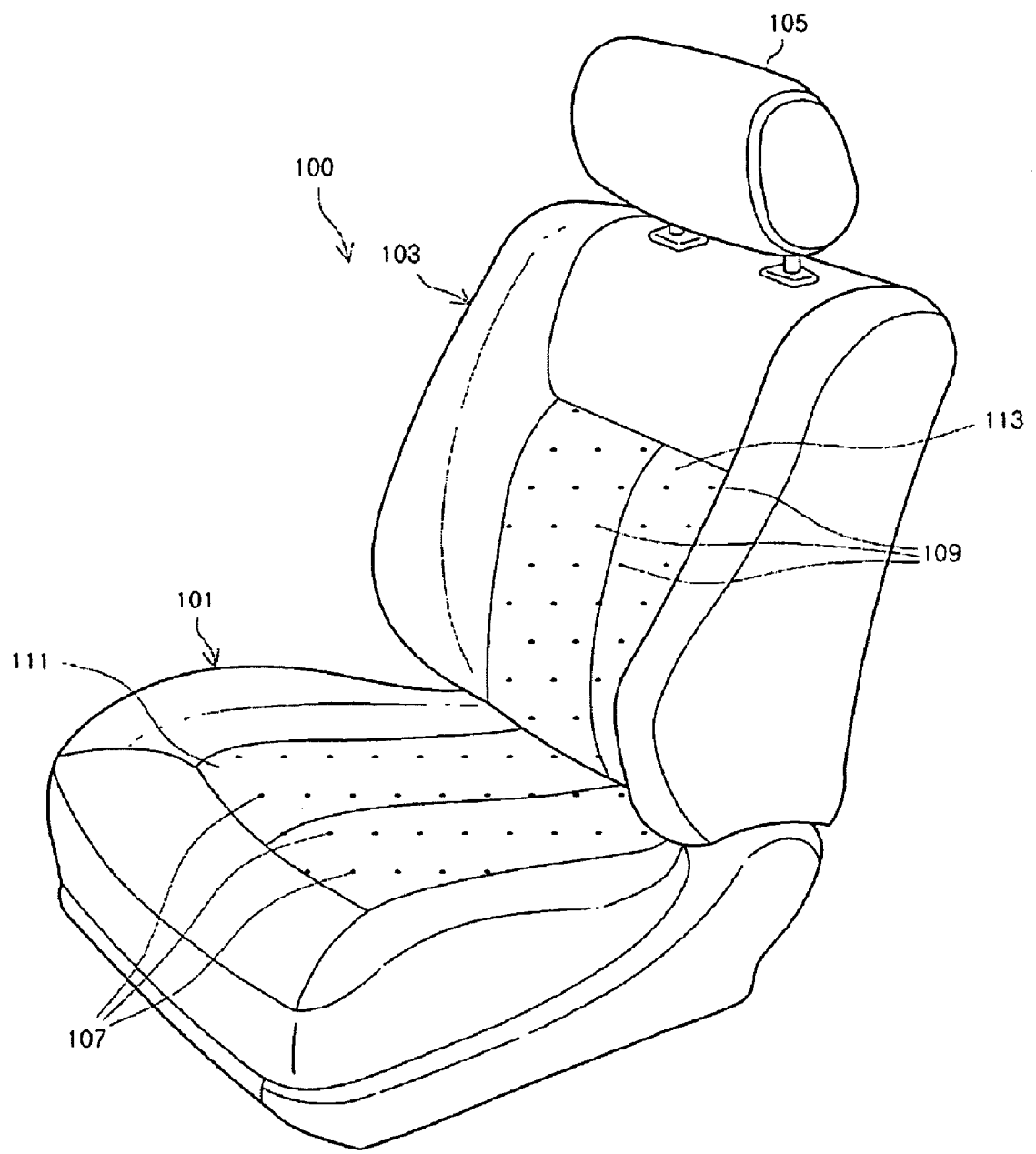
FIG. 1 is a perspective view of a vehicle seat to which a temperature control system according to an embodiment of the present invention is adopted.

100: vehicle seat 101: seat cushion
103: seat back 210: air duct
230: air-blowing fan 250: seat back temperature control unit
270: seat cushion temperature control unit

BEST MODE FOR CARRYING OUT THE INVENTION

Hereinafter, embodiments of the present invention will be explained with reference to the drawings.

FIG. 1 is a perspective view of a vehicle seat 100 to which a temperature control system according to an embodiment of the present invention is adopted.

Referring to FIG. 1, the vehicle seat 100 includes a seat cushion 101 and a seat back 103. The seat cushion 103 is connected to the seat cushion 101 in a substantially vertical direction, and a headrest 105 may be connected to an upper end of the seat back 103.

The seat cushion 101 and the seat back 103 respectively include covers 111 and 113 to which air holes 107 and 109 are respectively formed. Air temperature of which is controlled by the temperature control system according to an embodiment of the present invention is emitted through the air holes 107 and 109 so that temperature of the seat 100 is controlled.

Figure 2:
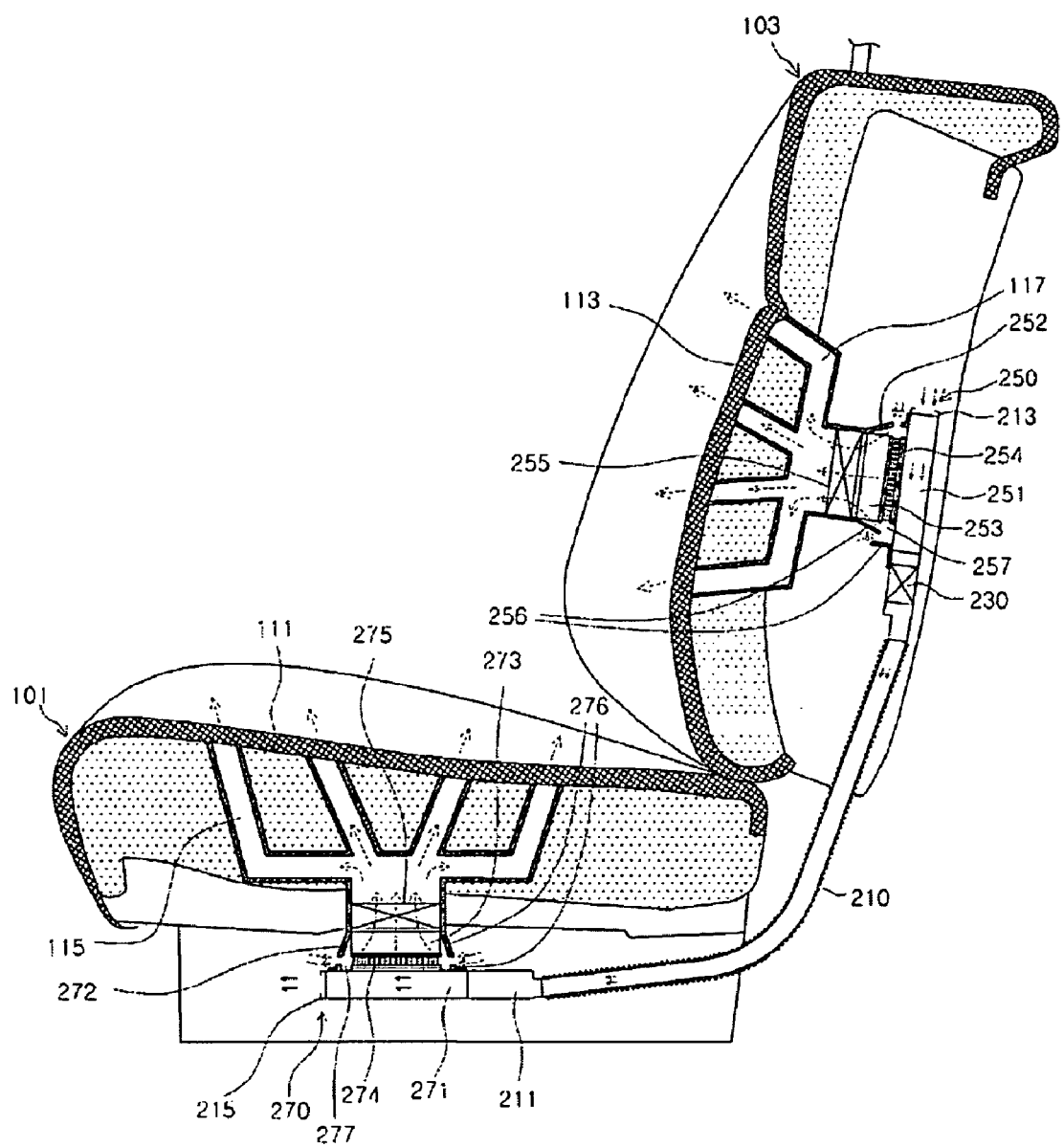
FIG. 2 is a cross-sectional view of a vehicle seat to which a temperature control system according to an embodiment of the present invention is adopted.

FIG. 2 is a cross-sectional view of a vehicle seat to which a temperature control system according to an embodiment of the present invention is adopted.

As shown in FIG. 2, air passages 115 and 117 are formed in the seat 100 to which the temperature control system according to an embodiment of the present invention is applied. That is, the air passage 115 is formed in the seat cushion 101 and an inner surface of the cover 111 contacts an end of the air passage 115, so that air flowing in the air passage 115 can be emitted toward the outside of the seat cushion 101 through the air hole 107 of the cover 111. Similarly, the air passage 117 is formed in the seat back 103 and an inner surface of the cover 113 contacts an end of the air passage 117, so that air flowing in the air passage 117 can be emitted toward the outside of the scat back 103 through the air hole 109 of the cover 113.

Although shape and size of the air passages 115 and 117 are exemplarily shown in FIG. 2, shape and size of the air passages 115 and 117 are not limited thereto and may be variously modified.

The temperature control system of a vehicle seat according to an embodiment of the present invention supplies temperature-controlled air to the vehicle seat so as to control the temperature of the vehicle seat.

Referring to FIG. 2, the temperature control system of a vehicle seat according to an embodiment of the present invention includes an air duct 210, an air-blowing device 230, a seat back temperature control unit 250, and a seat cushion temperature control unit 270.

The air duct 210 forms an air passage 211 therein both ends of which are penetrated. One end 213 of the air duct 210 is located at a predetermined position on a rear surface of the seat back 103, and the other end 215 of the air duct 210 is located at a predetermined position on a lower surface of the seat cushion 101. The air duct 210 may be formed in a shape that can be elongated along a lower surface of the seat cushion 101 and along a rear surface of the seat back 103.

The air-blowing device 230 urges air to flow through the air duct 210. For example, the air-blowing device 230 can be realized as an axial fan which is installed in the air passage 211 of the air duct 210. Hereinafter, the air-blowing device 230 is called an air-blowing fan.

The air-blowing fan 230 urges air to flow so that external air is sucked into the air passage 211 of the air duct 210 at one end thereof and is then discharged at the other end of the air passage 211.

The seat back temperature control unit 250 performs heat exchange between air flowing in the air duct 210 and air supplied to the seat back 103 so as to control the temperature of air supplied to the seat back 103.

Meanwhile, the seat cushion temperature control unit 270 performs heat exchange between air flowing in the air duct 210 and air supplied to the seat cushion 101 so as to control the temperature of air supplied to the seat cushion 101.

At this time, according to an embodiment of the present invention, the air duct 210 forms the single air passage 211 passing by both the seat back temperature control unit 250 and the seat cushion temperature control unit 270 so that air flowing in the air passage 211 thereof undergoes heat exchange with one of the seat back temperature control unit 250 and the seat cushion temperature control unit 270 and then undergoes heat exchange with the other.

As shown in FIG. 2, according to an embodiment of the present invention, the seat back temperature control unit 250 is installed to one end part of the air duct 210, the seat cushion temperature control unit 270 is installed to the other end of the air duct 210, and the air-blowing fan 230 urges air to flow so that air inflows at the end of both ends of the air duct 210 at which the seat back temperature control unit 250 is installed, then sequentially passes by the seat back temperature control unit 250 and the seat cushion temperature control unit 270, and is then discharged at the other end of the air duct 210. Accordingly, air which is sucked into the air duct 210 firstly undergoes heat exchange with the seat back temperature control unit 250 and then undergoes heat exchange with the seat cushion temperature control unit 270.

Although in an embodiment shown in FIG. 2 air firstly passes by the seat back temperature control unit and then passes by the seat cushion temperature control unit, air may be firstly passes by the seat cushion temperature control unit and then passes by the seat back temperature control unit in another embodiment of the present invention. This modification can be realized by changing the direction of air flow passing through the air duct, and this can be realized by changing air-blowing direction of the air-blowing fan. For this, the position of the air-blowing fan can be changed.

Since the air duct allows air flowing therein to sequentially undergo heat exchanges with the seat back temperature control unit and the seat cushion temperature control unit, the overall structure of the temperature control system can be substantially simplified. Furthermore, since air having undergone the heat exchange is discharged at a single passage, the structure for preventing air after the heat exchange from being discharged directly toward a passenger does not need.

Meanwhile, according to another embodiment of the present invention, the air-blowing device 230 blows air so that air flowing in the air duct 210 passes by the seat cushion temperature control unit 270 and then passes by the seat back temperature control unit 250, and the air duct 250 is formed to suck air below the seat cushion 101 and to discharge air behind the seat back 103. This modification can be realized by changing the air-blowing direction opposite to that of the temperature control system shown in FIG. 2. The temperature of air below the seat cushion 101 is lower than that of air behind the seat back 103 since the vertical position of the space below the seat cushion 101 is relatively lower that of the space behind the seat back 103, so air temperature of which is relatively lower is sucked and is used for the heat exchange, and thereby an efficiency of the cooling operation can be enhanced.

According to an embodiment of the present invention, the seat back temperature control unit 250 includes a heat exchanger (hereinafter referred to as a first heat exchanger) 251 which is disposed within the air duct 210, a heat exchanger (hereinafter referred to as a second heat exchanger) 253 which is disposed in an air moving passage 252 through which air supplied to the seat back 103 flows, a thermoelectric element thereinafter referred to as a first thermoelectric element) 254, and a fan (hereinafter referred to as a first fan) 255 which urges air to flow so that air having passed by the second heat exchanger 253 is supplied to the seat back 103.

As shown by the dotted line arrow in FIG. 2, air is sucked into the air moving passage 252 which is formed by a housing 256 by the operation of the first fan 255, and the sucked air is discharged to the air passage 117 of the seat back 103 after passing by the second heat exchanger 253.

The first thermoelectric element 254 is disposed between the first heat exchanger 251 and the second heat exchanger 253 so as to perform heat exchange between the first heat exchanger 251 and the second heat exchanger 253.

According to the operation of the first thermoelectric element 254, heat radiation process occurs in the first heat exchanger 251 and heat absorption process occurs in the second heat exchanger 253, or heat absorption process occurs in the first heat exchanger 251 and heat radiation process occurs in the second heat exchanger 253.

If heat radiation process occurs in the first heat exchanger 251 and heat absorption process occurs in the second heat exchanger 253, heat of air supplied to the seat back 103 is transferred to air flowing in the air duct 210 so that the seat back 103 is cooled. On the contrary, if heat absorption process occurs in the first heat exchanger 251 and heat radiation process occurs in the second heat exchanger 253, heat of air flowing in the air duct 210 is transferred to air supplied to the seat back 103 so that the seat back 103 is heated. In such a way, temperature of the seat back 103 can be controlled.

According to an embodiment of the present invention, the scat cushion temperature control unit 270 includes a heat exchanger (hereinafter referred to as a third heat exchanger) 271 which is disposed within the air duct 210, a heat exchanger (hereinafter referred to as a fourth heat exchanger) 273 which is disposed in an air moving passage 272 through which air supplied to the seat cushion 101 flows, a thermoelectric element (hereinafter referred to as a second thermoelectric element) 274, and a fan (hereinafter referred to as a second fan) 275 which urges air to flow so that air having passed by the fourth heat exchanger 273 is supplied to the seat cushion 101.

As shown by a dotted line arrow in FIG. 2, air is sucked into the air moving passage 272 which is formed by a housing 276 by the operation of the second fan 275, and the sucked air is discharged to the air passage 115 of the seat cushion 101 after passing by the fourth heat exchanger 273.

The second thermoelectric element 274 is disposed between the third heat exchanger 271 and the fourth heat exchanger 273 so as to perform heat exchange between the third heat exchanger 271 and the fourth heat exchanger 273.

According to the operation of the second thermoelectric element 274, heat radiation process occurs in the third heat exchanger 271 and heat absorption process occurs in the fourth heat exchanger 273, or heat absorption process occurs in the third heat exchanger 271 and heat radiation process occurs in the fourth heat exchanger 273.

If heat radiation process occurs in the third heat exchanger 271 and heat absorption process occurs in the fourth heat exchanger 273, heat of air supplied to the seat cushion 101 is transferred to air flowing in the air duct 210 so that the seat cushion 101 is cooled. On the contrary, if heat absorption process occurs in the third heat exchanger 271 and heat radiation process occurs in the fourth heat exchanger 273, heat of air flowing in the air duct 210 is transferred to air supplied to the seat cushion 101 so that the seat cushion 101 is heated. In such a way, temperature of the seat cushion 101 can be controlled.

The first thermoelectric element 254 and the second thermoelectric element 274 may be any thermoelectric element which can transfer heat in opposite directions depending on the direction of current applied thereto, and for example may be a Peltier element.

According to an embodiment of the present invention, the heat transfer area of the first heat exchanger 251 may be greater than the heat transfer area of the second heat exchanger 253. Furthermore, in more detail, the heat transfer area of the first heat exchanger 251 may be about 2.5 to 3 times greater than the heat transfer area of the second heat exchanger 253.

Meanwhile, according to another embodiment of the present invention, the heat transfer area of the third heat exchanger 271 may be greater than the heat transfer area of the fourth heat exchanger 273. Furthermore, in more detail, the heat transfer area of the third heat exchanger 271 may be about 2.5 to 3 times greater than the heat transfer area of the fourth heat exchanger 273.

In case that the heat transfer area of the first heat exchanger 251 is greater than the heat transfer area of the second heat exchanger 253 or the heat transfer area of the third heat exchanger 271 is greater than the heat transfer area of the fourth heat exchanger 273, the cooling efficiency can be further enhanced. In particular, in case that the heat transfer area of the first heat exchanger 251 is about 2.5 to 3 times greater than the heat transfer area of the second heat exchanger 253 or the heat transfer area of the third heat exchanger 271 is about 2.5 to 3 times greater than the heat transfer area of the fourth heat exchanger 273, the optimal cooling efficiency can be obtained.

Since heat from the outside is additionally transferred while heat of the second heat exchanger 253 and the fourth heat exchanger 273 is transferred to the first heat exchanger 251 and the third heat exchanger 271, the first heat exchanger 251 and the third heat exchanger 271 can more effectively radiate heat in case that the heat transfer areas of the third heat exchanger 251 and the third heat exchanger 271 are greater than the heat transfer areas of the second heat exchanger 253 and the fourth heat exchanger 273.

In particular, since the first thermoelectric element 254 and the second thermoelectric element 274 respectively absorb heat from the outside of amount of heat corresponding to about 1.5 to 2 times heats which are respectively transferred from the second heat exchanger 253 and the fourth heat exchanger 273 to the first heat exchanger 251 and the third heat exchanger 271 and the absorbed heats are respectively transferred to the first heat exchanger 251 and the third heat exchanger 271, the first heat exchanger 251 and the third heat exchanger 271 respectively radiate heats about 2.5 to 3 times heat absorbed by the second heat exchanger 253 and the fourth heat exchanger 274 respectively. Accordingly, in case that the heat transfer areas of the first heat exchanger 251 and the third heat exchanger 271 are about 2.5 to 3 times greater than the heat transfer areas of the second heat exchanger 253 and the fourth heat exchanger 273 respectively, the optimal heat transfer efficiency can be obtained.

The seat back temperature control unit 250 may further include a case 256 which houses the second heat exchanger 253 and the first thermoelectric element 254. The case 256 forms a condensed water passage 257 which is configured to send condensed water formed on the surface of the second heat exchanger 253 to the first heat exchanger 251.

Similarly, the seat cushion temperature control unit 270 may further include a case 276 which houses the fourth heat exchanger 273 and the second thermoelectric element 274. The case 276 defines a condensed water passage 277 which is configured to send condensed water formed on the surface of the fourth heat exchanger 273 to the third heat exchanger 271.

In case that the seat back temperature control unit 250 and the seat cushion temperature control unit 270 may be stopped during supplying cooled air to the seat back 103 and the seat cushion 101, vapor can be condensed by the cooled second heat exchanger 253 and the cooled fourth heat exchanger 273 so that condensed water may be produced, and the condensed water flows to the heated first heat exchanger 251 and the heated third heat exchanger 271 through the condensed water passages 257 and 277 respectively and is then evaporated. Accordingly, problems which may be caused by the accumulation of condensed water within the temperature control system can be solved.

Referring again to FIG. 2, in a temperature control system of a vehicle seat according to an embodiment of the present invention, the air-blowing fan 230 urges air to flow so that air flowing in the air duct 210 firstly passes by the seat back temperature control unit 250 and then passes by the seat cushion temperature control unit 270, and the air duct 210 sucks air behind the seat back 103 and discharges air below the seat cushion 101.

That is, as shown by the solid arrow in FIG. 2, air is sucked into the end 213 of the air duct 210, then passes by the first heat exchanger 251, then flows through the air passage 211 of the air duct 210, and is then discharged to the other end 215 of the air duct 210.

Accordingly, air having undergone heat exchange with the seat back temperature control unit 250 and the seat cushion temperature control unit 270 is discharged through a single outlet which is disposed below the seat cushion 101, so air having undergone heat exchange can be prevented from being discharged directly toward a passenger without particular layout changes.

The temperature control system of a vehicle seat according to an embodiment of the present invention may include a control unit (not shown) which outputs control signals for controlling operations of the air-blowing fan 230, the first thermoelectric element 254, the second thermoelectric elements 274, the first fan 255, and the second fan 275.

The control unit may include a microprocessor, a memory, and related hardware and software, and is formed to perform the control method as will be appreciated by one of ordinary skill in the art. For example, the microprocessor is activated by predetermined program which is programmed to perform the control method that makes the temperature control system to perform heating or cooling operation, and various data for the same are stored in the memory.

While this invention has been described in connection with what is presently considered to be the most practical exemplary embodiments, it is to be understood that the invention is not limited to the disclosed embodiments, but, on the contrary, is intended to cover various modifications and equivalent arrangements included within the spirit and scope of the appended claims.

Throughout this specification and the claims which follow, unless explicitly described to the contrary, the word comprise or variations thereof will be understood to imply the inclusion of stated elements but not the exclusion of any other elements.

INDUSTRIAL APPLICABILITY

The present invention is applicable to a system for controlling temperature of a seat of a vehicle.

The invention claimed is:

1. A temperature control system supplies temperature-controlled air to a vehicle seat so as to control temperature of the vehicle seat, comprising: an air duct; an air-blowing device urging air to flow through the air duct; a seat back temperature control unit performing heat exchange between air flowing in the air duct and air supplied to a seat back so as to control temperature of the air supplied to the seat back; and a seat cushion temperature control unit performing heat exchange between air flowing in the air duct and air supplied to a seat cushion so as to control temperature of the air supplied to the seat cushion, wherein the air duct forms a single air passage passing by the seat back temperature control unit and the seat cushion temperature control unit so that the air flowing in the air duct undergoes heat exchange with one of the seat back temperature control unit and the seat cushion temperature control unit and then undergoes heat exchange with the other.

2. The temperature control system of claim 1, wherein the seat back temperature control unit comprises: a first heat exchanger is disposed within the air duct; a second heat exchanger is disposed in an air moving passage through which air supplied to the seat back flows; a first thermoelectric element which is disposed between the first heat exchanger and the second heat exchanger so as to perform heat exchange between the first heat exchange and the second heat exchanger; and a first fan urging air to flow so that air having passed by the second heat exchanger is supplied to the seat back, and wherein the seat cushion temperature control unit comprises: a third heat exchanger is disposed within the air duct; a fourth heat exchanger is disposed in an air moving passage through which air supplied to the seat cushion flows; a second thermoelectric element is disposed between the third heat exchanger and the fourth heat exchanger so as to perform heat exchange between the third heat exchange and the fourth heat exchanger; and a second fan urging air to flow so that air having passed by the fourth heat exchanger is supplied to the seat cushion.

3. The temperature control system of claim 2, wherein heat transfer area of the first heat exchanger is greater than heat transfer area of the second heat exchanger.

4. The temperature control system of claim 3, wherein the heat transfer area of the first heat exchanger is 2.5 to 3 times greater than the heat transfer area of the second heat exchanger.

5. The temperature control system of claim 2, wherein heat transfer area of the third heat exchanger is greater than heat transfer area of the fourth heat exchanger.

6. The temperature control system of claim 5, wherein the heat transfer area of the third heat exchanger is 2.5 to 3 times greater than the heat transfer area of the fourth heat exchanger.

7. The temperature control system of claim 2, wherein the seat back temperature control unit further comprises a case, the case houses the second heat exchanger and the first thermoelectric element, and the case forms a condensed water passage, the condensed water passage is configured to send condensed water formed on a surface of the second heat exchanger to the first heat exchanger.

8. The temperature control system of claim 2, wherein the seat cushion temperature control unit further comprises a case, the case houses the fourth heat exchanger and the third thermoelectric element, and the case forms a condensed water passage which is configured to send condensed water formed on a surface of the fourth heat exchanger to the third heat exchanger.

9. The temperature control system of claim 1, wherein the air-blowing device urges air to flow so that air flowing in the air duct firstly passes by the seat back temperature control unit and then passes by the seat cushion temperature control unit, and the air duct is configured to suck air behind the seat back and to discharge air below the seat cushion.

10. The temperature control system of claim 1, wherein the air-blowing device urges air to flow so that air flowing in the air duct firstly passes by the seat cushion temperature control unit and then passes by the seat back temperature control unit, and the air duct is configured to suck air below the seat cushion and to discharge air behind the seat back.

11. The temperature control system of claim 1 further comprising a control unit for controlling the seat back temperature control and the seat cushion temperature control unit.

* * * * *